(12) United States Patent
Morrison

(10) Patent No.: US 6,929,837 B2
(45) Date of Patent: Aug. 16, 2005

(54) REMOVABLE LABELS FOR MOUNTING UPON OR PROXIMATE TO ELECTRICAL AND/OR OTHER INTERFACES

(76) Inventor: Rod Morrison, P.O. Box 1681, Vero Beach, FL (US) 32961

( * ) Notice: Subject to any disclaimer, the term of this patent is extended or adjusted under 35 U.S.C. 154(b) by 0 days.

(21) Appl. No.: 10/350,379

(22) Filed: Jan. 22, 2003

(65) Prior Publication Data

US 2003/0165653 A1 Sep. 4, 2003

Related U.S. Application Data

(60) Provisional application No. 60/350,890, filed on Jan. 22, 2002.

(51) Int. Cl.[7] ................................. G09F 3/00
(52) U.S. Cl. ................. 428/40.1; 283/81; 428/41.3; 428/41.6; 428/41.7; 428/42.1; 428/42.2; 428/42.3
(58) Field of Search ............................. 428/40.1, 41.7, 428/42.1, 42.2, 42.3, 41.6; 283/81

(56) References Cited

U.S. PATENT DOCUMENTS 5,212,899 A * 5/1993 Fandreyer ................ 40/661.11
5,358,094 A * 10/1994 Molinaro ................... 40/524
5,693,911 A * 12/1997 Sydow ...................... 283/81
6,129,963 A * 10/2000 Lesko ........................ 428/40.1

FOREIGN PATENT DOCUMENTS

GB          2268153       *  1/1994

* cited by examiner

*Primary Examiner*—Nasser Ahmad (57) ABSTRACT

A repositionable label for mounting upon or proximate to electrical or other types of interfaces may identify devices associated with such interfaces. A label may include a static cling or other type of substrate that carries identifying information. The identifying information may exist in textual, symbolic, iconic, tactile, chromatic, and/or other formats, and may correspond to common types of electrical devices and/or appliances controlled through electrical and/or other types of interfaces. Such interfaces may include switch covers and/or switches associated therewith; fuse or circuit boxes and/or switches residing therein; outlets; power strips; and/or other interfaces typically found in households, offices, or other environments.

8 Claims, 7 Drawing Sheets

REMOVABLE LABELS FOR MOUNTING UPON OR PROXIMATE TO ELECTRICAL AND/OR OTHER INTERFACES

CROSS-REFERENCE TO RELATED APPLICATION

This Application claims priority to U.S. Provisional Application No. 60/350,890, filed on Jan. 22, 2002.

FIELD OF THE INVENTION

The present invention generally relates to labels and labeling. More particularly, the present invention comprises a set of removable labels that may be mounted upon or proximate to electrical or other interfaces for identifying common household or other devices controlled thereby.

BACKGROUND

Figure 1:
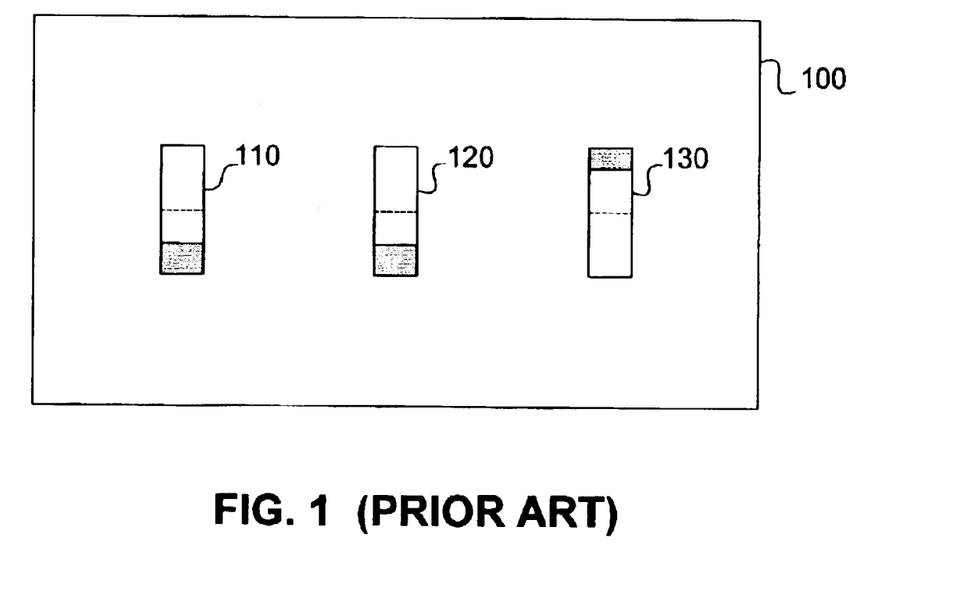
FIG. 1 is a front view of an exemplary switch plate.

People occupying new, relatively new, or temporary surroundings or dwellings may be confronted with electrical switches, outlets, and/or fixtures with which they are unfamiliar. FIG. 1 is a front view of an exemplary switch plate 100 that includes a first switch 110, a second switch 120, and a third switch 130. The switch plate 100 may be placed or positioned in an environment such as a kitchen. In such an environment, the first switch 100 may control a centrally-disposed light, while the second switch 120 may control an overhead light above a sink, and the third switch 130 may control a garbage disposal. A person unaccustomed to such a switch arrangement may inadvertently turn on the third switch 130, thereby activating the garbage disposal instead of the sink light, or vice-versa. The person may repeatedly make such mistakes until they become familiar with which switch 110, 120, 130 controls which device. Unfortunately, familiarization may take time, which may lead to frustration. What is needed is a way to easily and/or temporarily label electrical interfaces to identify common household devices controlled thereby.

INVENTION DESCRIPTION

Figure 2:
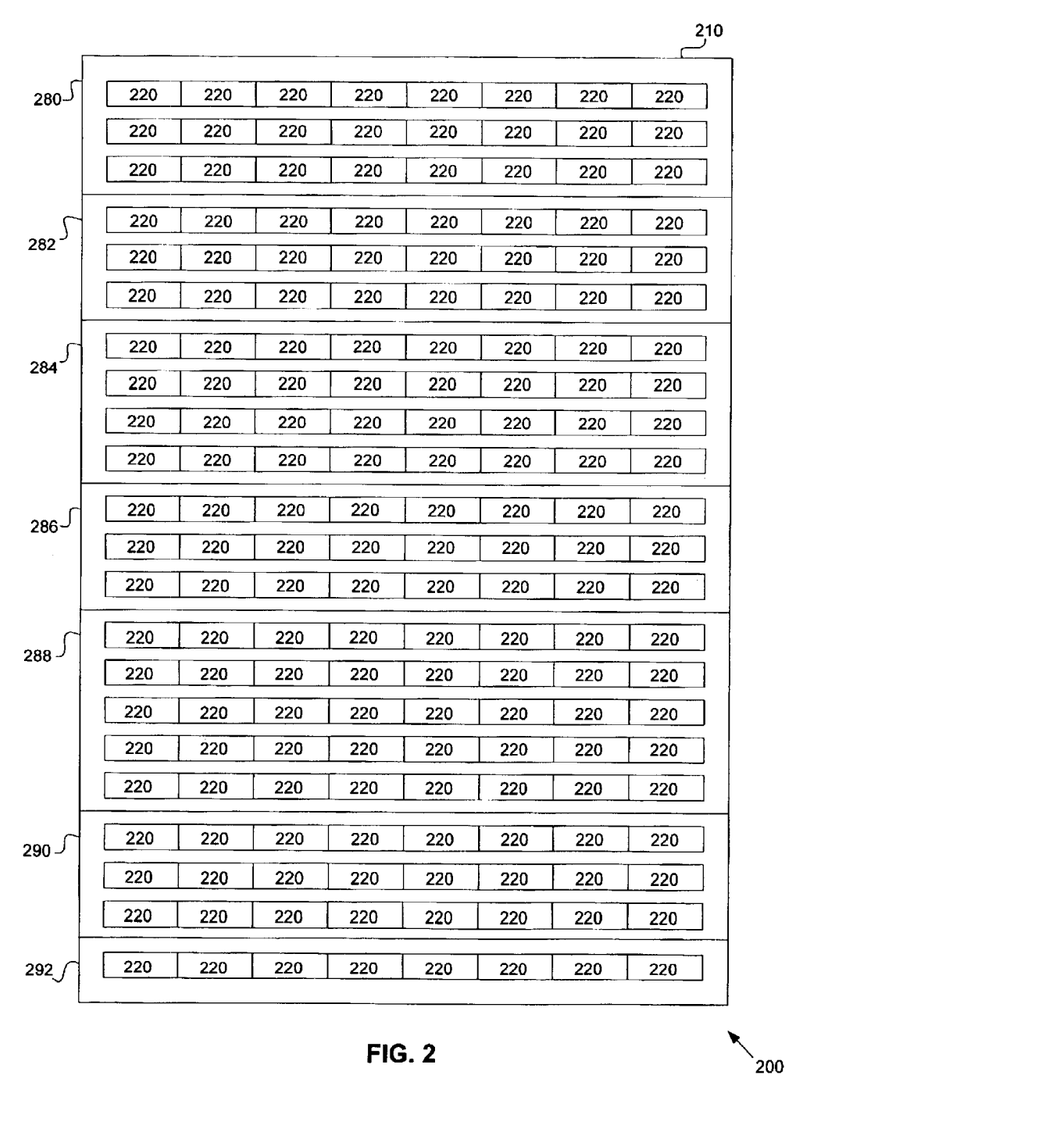
FIG. 2 is a top view of a label sheet according to an embodiment of the invention.

FIG. 2 is a front view of a label sheet 200 according to an embodiment of the invention. In one embodiment, the label sheet 200 comprises a release liner 210 upon which a set of removable and/or repositionable labels 220 reside. Labels 220 may reside adjacent, generally adjacent, proximate, and/or generally proximate to one another, and may or may not be separated from each other by a border. The release liner 210 may comprise a conventional low-friction and/or smooth material such as paper, plastic, metal, or the like. The release liner 210 may include or incorporate a low-friction coating, such as silicone, in a manner readily understood by those skilled in the art.

Figure 3:
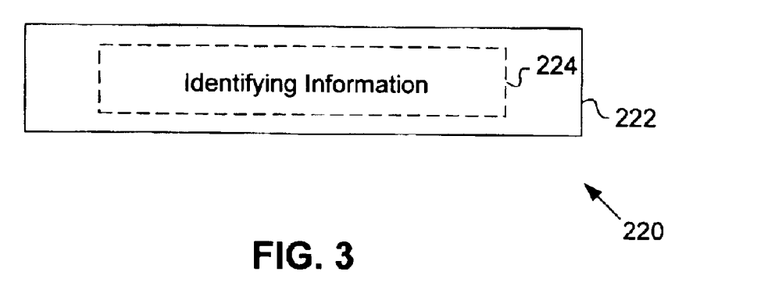
FIG. 3 is a front view of a label according to an embodiment of the invention.

FIG. 3 is a front view of a label 220 according to an embodiment of the invention. In one embodiment, the label 220 comprises a removable and/or repositionable film or substrate 222; and textual, symbolic, iconic, chromatic, tactile, and/or other identifying information 224 printed, affixed, embedded, embossed, and/or otherwise created thereupon and/or therein and/or carried by the label 220 for indicating common types of electrical devices controlled through electrical interfaces. Electrical interfaces may include, for example, switch covers; fuse or circuit boxes and/or switches therein; outlets; power strips; and/or other interfaces typically found in households, offices, or other environments.

One side of a label film or substrate 222 may serve as a contact side for application or attachment to, proximate to, or generally near an electrical interface. The attachment or binding properties of a label 220 may depend upon the properties of the materials from which the label substrate 222 is manufactured, and/or the properties of the label's identifying information 224. A label's attachment or binding properties may arise from electrostatic interactions, and/or an appropriate amount of plasticizer or other constituent material that provides desired physical and/or chemical properties, in a manner understood by those skilled in the art. In one embodiment, a label film or substrate 222 may be formed from static cling material, such as a conventional polymeric vinyl film. Static cling materials may exhibit adhesion to smooth, generally non-porous surfaces, including bare and/or coated metals, plastics, and/or glasses. One exemplary static cling material suitable for use as a label substrate 222 according to an embodiment of the invention is Avery Graphics™ Static Cling calendered vinyl film (Avery Graphics Media North America, Santa Fe Springs, Calif., and www.averygraphics.com). Static cling inkjet printer sheets (available from www.rippedsheets.com) may also be suitable for label substrate use.

A label film or substrate 222 may alternatively or additionally comprise an oriented-polypropylene substrate, such as ClingZ® manufactured by Permacharge Corporation of Rio Rancho, N.Mex. (www.permacharge.com), and available through Transilwrap of Franklin Park, Ill. (www.transilwrap.com). Such a material includes a permanent or quasi-permanent electrostatic charge therein, and may exhibit adhesion to a wide variety of surfaces, including drywall, wood, and/or brick.

According to an embodiment of the invention, a label's identifying information 224 indicates or corresponds to a commonly encountered type of electrical or other type of device, as further detailed below. Identifying information 224 may be formed in a variety of manners. In one embodiment, identifying information 224 may be printed upon the label film 220 using conventional offset, screen, and/or digital printing processes in conjunction with appropriate types of conventional inks and/or dyes. Identifying information 224 may be applied to a label substrate 222 through inkjet or laser printing. Identifying information 224 may alternately or additionally be embossed, embedded, or otherwise formed in or upon the label film 222.

Relative to appearance, a label's film or substrate 222 may be colored (including multicolored), partially colored, opaque, or optically clear. The label's identifying information 224 may be colored (including multicolored), partially colored, opaque, or optically clear, depending upon or in accordance with the coloring or shading of the substrate 222.

A label substrate 222 and/or identifying information 224 may comprise pigments, powders, granules, coatings, particles, or the like to provide desired optical characteristics, such as iridescent, luminescent, and/or glow-in-the-dark capabilities.

In one embodiment, identifying information 224 comprises text. FIGS. 4A through 4M are front views of labels 220 having exemplary textual identifying information 224. Each label 220 shown in FIGS. 4A through 4O includes a word or phrase associated with or corresponding to an electrical device or fixture commonly encountered in a home environment. In particular, identifying information 224 in FIGS. 4A through 4O comprises the words "MAIN KITCHEN," "SINK LIGHT," "GARBAGE DISPOSAL," "GARAGE," "PATIO," "ENTRY," "WALKWAY," "CEILING LIGHT," "CEILING FAN", "OUTLET," "CLOSET LIGHT," "MAIN BATHROOM," and "EXHAUST FAN" in the manners shown. Alternate or additional labels 220 may include other words and/or phrases, such as "POOL," "JACUZZI," or "LEFT FRONT BURNER." Those skilled in the art will recognize that any given textual identifying information 224 may comprise additional or fewer words in alternate embodiments, provided such words effectively convey electrical device association(s).

Figure 4A:
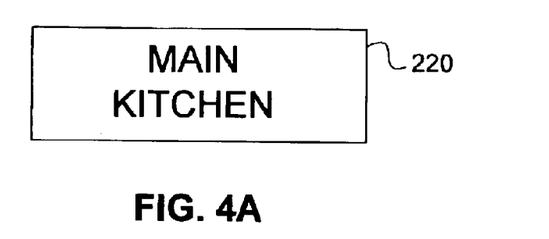
FIGS. 4A through 4M are front views of labels having exemplary textual identifying information according to an embodiment of the invention.
Figure 4B:
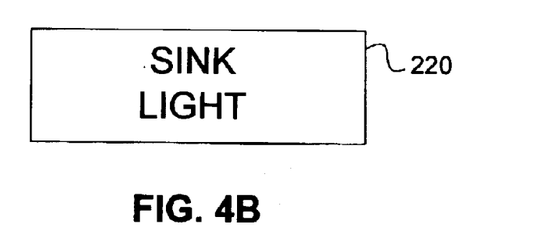
Figure 4C:
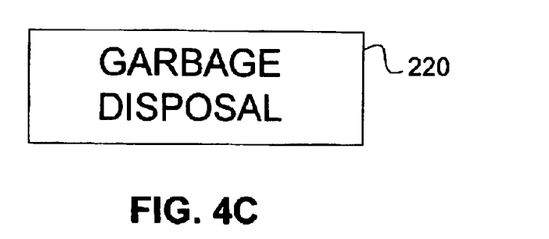
Figure 4D:
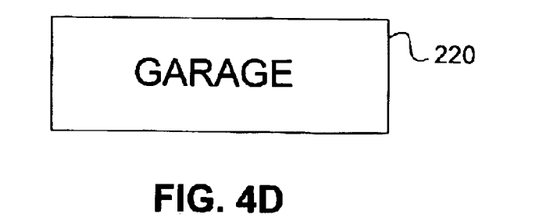
Figure 4E:
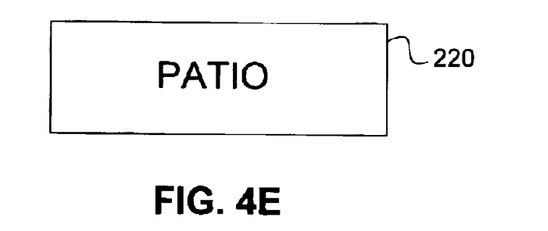
Figure 4F:
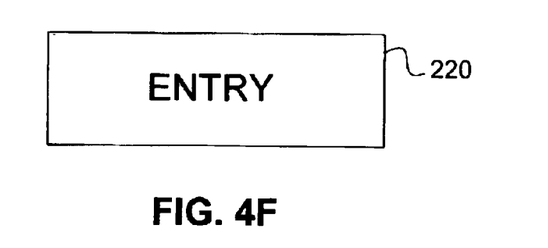
Figure 4G:
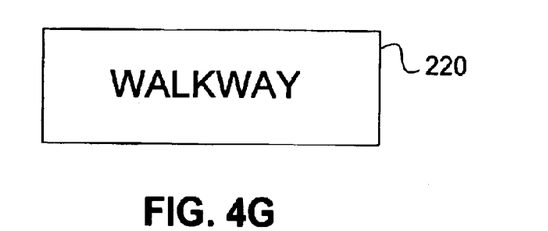
Figure 5A:
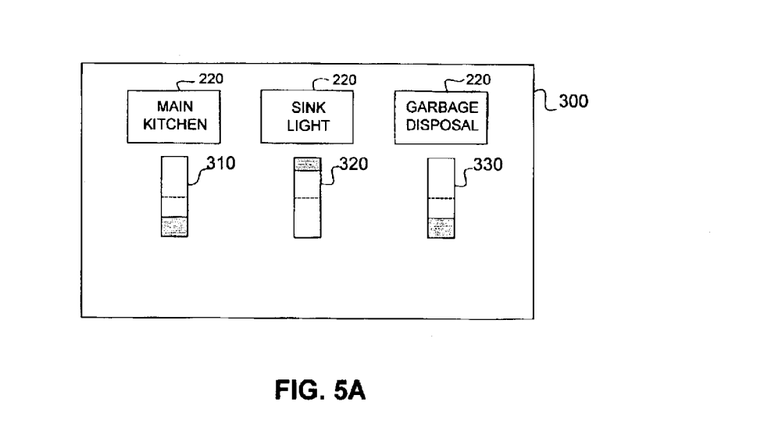
FIG. 5A is a front view of an exemplary switch plate labeled in accordance with FIGS. 4A, 4B, and 4C.

FIG. 5A is an exemplary switch plate 300 covering or placed over a first, a second, and a third switch 310, 320, 330 that are labeled in accordance with labels 220 shown in FIGS. 4A, 4B, and 4C. In particular, a label 220 mounted or placed above the first switch 310 indicates that the first switch 310 corresponds to or controls a main kitchen light. Similarly, a label 220 mounted above the second switch 320 may indicate that the second switch 320 controls a light above or near a kitchen sink, and a label 220 mounted above the third switch 330 indicates that the third switch 330 controls a garbage disposal.

Figure 5B:
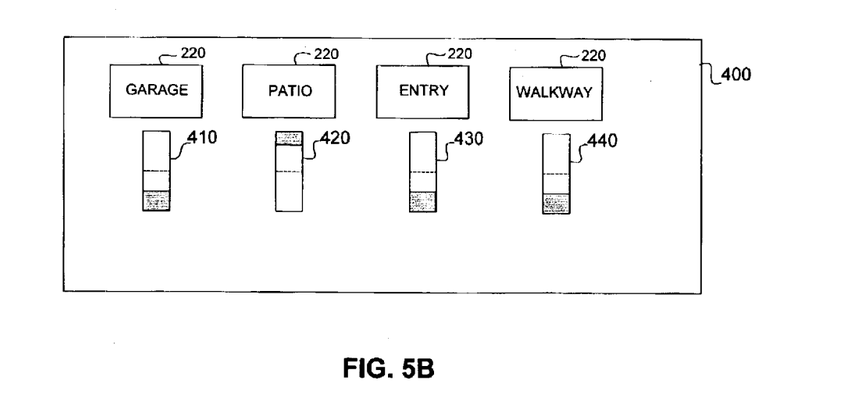
FIG. 5B is a front view of an exemplary switch plate labeled in accordance with FIGS. 4D, 4E, 4F, and 4G.

FIG. 5B is an exemplary switch plate 400 that covers a first, a second, a third, and a fourth switch 410, 420, 430, 440 that are labeled in accordance with labels 220 shown in FIGS. 4D, 4E, 4F, and 4G. In particular, a label 220 mounted, placed, or positioned above the first switch 410 indicates that the first switch 410 corresponds to or controls a garage light. Additionally, a label 220 above the second switch 420 indicates that the second switch 420 controls a patio light; a label 220 above the third switch 430 indicates that the third switch 430 controls a light in an entryway; and a label 220 above the fourth switch 440 indicates that the fourth switch 440 controls a light associated with a walkway.

Figure 4H:
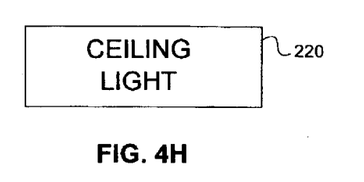
Figure 4I:
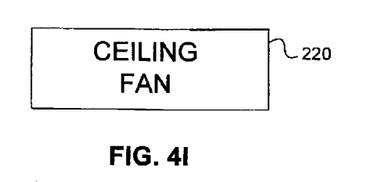
Figure 4J:
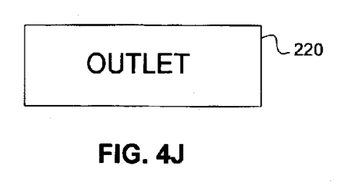
Figure 4K:
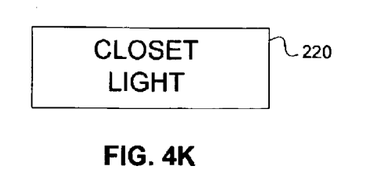
Figure 4L:
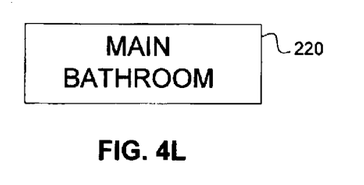
Figure 4M:
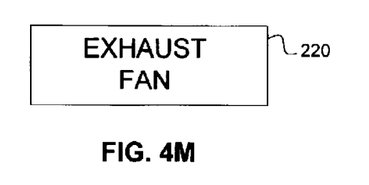
Figure 5C:
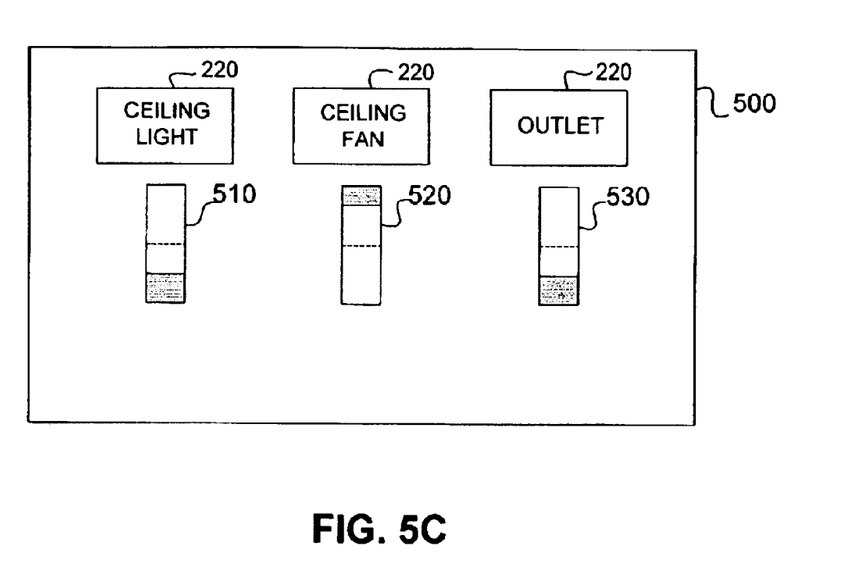
FIG. 5C is a front view of an exemplary switch plate labeled in accordance with FIGS. 4H, 4I, and 4J.

FIG. 5C is an exemplary switch plate 500 that covers a first, a second, and a third switch 510, 520, 530 that are labeled in accordance with labels 220 shown in FIGS. 4H, 4I, and 4J. In particular, a label 220 mounted adjacent to the first switch 510 indicates that the first switch 510 controls a ceiling light, while a label 220 applied adjacent to the second switch 520 indicates that the second switch 520 controls a ceiling fan, and a label 220 applied adjacent to the third switch 530 indicates that the third switch 530 controls or activates an electrical outlet.

Figure 6A:
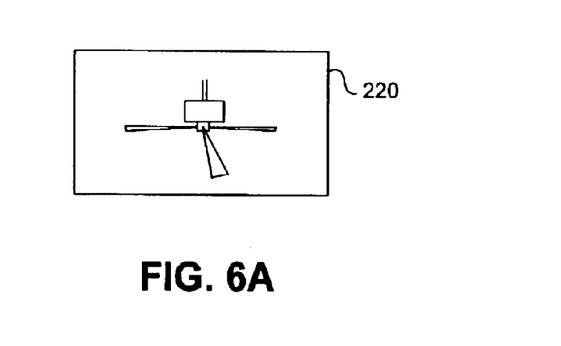
FIG. 6A is a front view of a label having an icon corresponding to a ceiling fan.
Figure 6B:
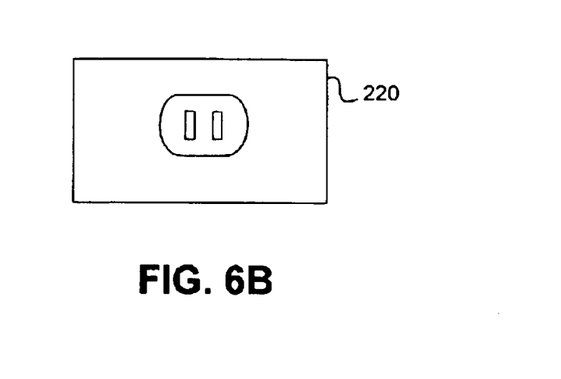
FIG. 6B is a front view of a label having an icon corresponding to an outlet.

Identifying information 224 on one or more labels 220 may alternatively or additionally comprise symbols and/or icons. FIG. 6A is a front view of a label 220 that includes an icon representing a ceiling fan; and FIG. 6B is a front view of a label 220 that includes an icon representing an outlet. The labels 220 shown in FIG. 6A and/or 6B may be placed or mounted upon or near a switch cover plate in a manner analogous to that depicted in FIGS. 5A, 5B, and/or 5C. In another embodiment, one or more labels 220 may symbolically indicate a given type of control associated with an electrical appliance, for example, and on/off button, a volume control, or a given burner position upon a stove.

In other embodiments, identifying information 224 may comprise or include tactile information, such as raised or depressed lines, ridges, dots, areas, and/or regions. For example, a label 220 may include or incorporate a set of Braille bumps corresponding to the phrase "garbage disposal." Similarly, a label 220 may include a set of Braille bumps corresponding to the phrase "Jacuzzi heater." Such Braille labels may be applied to switch cover plates in a manner analogous to that depicted in FIGS. 5A, 5B, and/or 5C. As another example, a label 220 may include a set of Braille bumps corresponding to the phrase "water heater." Such a label 220 may be applied to a circuit breaker or fuse box, or a switch within a circuit breaker or fuse box.

Labels 220 generated, produced, or manufactured in accordance with the present invention may include other textual, symbolic, iconic, tactile, and/or chromatic identifying information 224, depending upon the type of electrical or other interface to which they are directed. For example, labels 220 directed toward circuit breaker or fuse boxes may include textual identifying information 224 specifying or corresponding to "MAIN BREAKER," "WASHER/DRYER," "WATER HEATER," "KITCHEN LIGHTS," "DISHWASHER," "MASTER BEDROOM," "MASTER BATHROOM," "SECOND BEDROOM," "SECOND BATHROOM," and/or other identifying information 224. As another example, labels 220 for application to power strips may include identifying information 224 such as "COMPUTER," "DESK LIGHT," "STEREO," and/or "TV," and/or generally equivalent words, phrases, and/or symbols or icons. As yet another example, a label 220 for application to outlets may include identifying information 224 such as "SWITCH CONTROLLED," or a generally equivalent word, phrase, or icon. Additionally, labels 220 generated, produced, or manufactured in accordance with the present invention may include identifying information 224 indicating or corresponding to functional status or working condition, such as "BROKEN," "FAULTY," or "INSPECTED." Such labels 220 may be applied or employed in manners analogous to those described above, in addition to or separate from other labels 220.

Referring again to FIG. 2, any given label sheet 200 may include labels 220 organized categorically according to type. For example, a label sheet 200 may include a first section 280 in or upon which labels 220 directed toward kitchen use reside; a second section 282 in which labels 220 directed toward living room and/or family room use reside; a third section 284 in which labels 220 directed toward bedroom use reside; a fourth section 286 in which labels 220 directed toward bathroom use reside; a fifth section 288 in which labels 220 directed toward entry area and/or outdoor use reside; a sixth section 290 in which labels 220 directed toward circuit breaker or fuse box use reside; a seventh section 292 in which labels directed toward indicating functional status or working condition reside; and/or other sections. Any given section 280, 282, 284, 286, 288, 290, 292 may include a corresponding section heading and/or description to aid understanding. A label sheet 200 may include fewer or additional sections, and/or any given label sheet 200 may be organized differently. Moreover, a set of label sheets 200 produced in accordance with the present invention may be arranged in a folder or binder to form one or more portions of move-in materials that may be useful to home builders, real estate agents, leasing agents, new tenants, and/or others.

The present invention may additionally comprise a system for producing, generating, or printing removable and/or repositionable labels 220 for identifying electrical controls, fixtures, and the like. In one embodiment, such a system includes a personal computer having an inkjet printer coupled thereto. The personal computer may include a processing unit; a data storage unit; a keyboard, a mouse, and an input/output unit; a display device; a network interface unit; and a memory, in a manner readily understood by those skilled in the art. Within the memory, an operating system may manage access to various system hardware and/or software resources. Additionally, program instructions within the memory may direct the generation and/or printing of textual and/or iconic identifying information 224 upon a label substrate 222 such as a static cling inkjet printer sheet. Such program instructions may be responsive to user input, and may provide for the retrieval of common identifying information 224 from a library within a local and/or remote database; updating of such databases; and/or the printing of such identifying information 224 upon sheets of static cling material.

The preceding description is intended to enable a person skilled in the art to make and use the present invention. The general principles described herein may be applied to embodiments and applications other than those detailed above without departing from the spirit and scope of the present invention as defined by the appended claims. The present invention is not intended to be limited to the embodiments shown, but is to be accorded the widest scope consistent with the principles and features disclosed herein.

What is claimed is:

1. A label in combination with an electrical cover plate comprising:
   an electrical cover plate having an exterior surface;
   a repositionable label substrate comprising a static cling material adheres to the exterior surface of the electrical cover plate as well as the label is removable from the exterior surface of the electrical cover plate and the label is repositionable upon the exterior surface of the electrical cover plate; and
   an identifier that is integrally carried by the repositionable label substrate, the identifier indicating a type of device associated with the exterior surface of the electrical cover plate, the identifier comprising a set of topographic variations conveying the identity of the device in response to touch.

2. The label of claim 1, wherein the device comprises one from the group of a switch, an outlet, and an electrical appliance.

3. The label of claim 1, wherein the repositionable substrate comprises a vinyl film.

4. The label of claim 1, wherein the repositionable substrate comprises a material carrying an electrostatic charge therein.

5. The label of claim 4, wherein the repositionable substrate comprises an oriented polypropylene substrate.

6. The label of claim 1, wherein the identifier additionally comprises at least one from the group of a textual, a symbolic, and an iconic identifier.

7. The label of claim 6, wherein the repositionable substrate comprises a material that exhibits glow in the dark properties.

8. The label of claim 6, wherein the identifier comprises a material that exhibits glow in the dark properties.

* * * * *